US007170825B2

(12) United States Patent
Takahashi

(10) Patent No.: US 7,170,825 B2
(45) Date of Patent: Jan. 30, 2007

(54) POWER RESERVE DISPLAY MECHANISM AND MECHANICAL TIMEPIECE HAVING THE SAME

(75) Inventor: Takashi Takahashi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/356,694

(22) Filed: Feb. 17, 2006

(65) Prior Publication Data

US 2006/0187758 A1 Aug. 24, 2006

(30) Foreign Application Priority Data

Feb. 22, 2005 (JP) ............................ 2005-046093

(51) Int. Cl.
*G04B 9/00* (2006.01)
*G04B 1/10* (2006.01)
*F03G 1/00* (2006.01)

(52) U.S. Cl. ........................ 368/66; 368/140; 368/210; 185/44

(58) Field of Classification Search .................. 368/64, 368/66, 124, 127, 139, 140, 145, 203, 210, 368/212; 185/44
See application file for complete search history.

(56) References Cited

U.S. PATENT DOCUMENTS 5,699,322 A * 12/1997 Born ........................... 368/66
5,828,628 A * 10/1998 Born et al. .................... 368/66
6,166,999 A * 12/2000 Jujo et al. ..................... 368/66
6,826,124 B2 * 11/2004 Born ........................... 368/66

* cited by examiner

*Primary Examiner*—Vit W. Miska
(74) *Attorney, Agent, or Firm*—Adams & Wilks

(57) ABSTRACT

To provide a power reserve display mechanism having a mainspring remaining amount display showing a novel behavior and a mechanical timepiece having the same. A power reserve display mechanism of a mechanical timepiece includes a displacement conversion mechanism having a first rotation input portion coupled to a ratchet wheel and rotated in accordance with rotation of the ratchet wheel and a second rotation input portion coupled to a barrel wheel and rotated in accordance with rotation of the barrel wheel as well as an output portion moved linearly in one direction in accordance with rotation of the first rotation input portion and moved linearly in other direction in accordance with rotation of the second rotation input portion, and mainspring accumulating remaining amount display means provided at the output portion of the displacement conversion mechanism for displaying a mainspring accumulating remaining amount by a position along a linear line. The mainspring accumulating remaining amount display means is moved in parallel with an extended face of a dial on a side of the dial of the timepiece.

8 Claims, 5 Drawing Sheets

POWER RESERVE DISPLAY MECHANISM AND MECHANICAL TIMEPIECE HAVING THE SAME

BACKGROUND OF THE INVENTION

1. Field of the Invention

The present invention relates to a power reserve display mechanism for displaying a remaining amount of a mainspring in a mechanical timepiece constituting a power source thereof by the mainspring.

2. Description of the Prior Art

In a background art, a planetary mechanism (planetary gear mechanism) is normally used for a power reserve display mechanism, with regard to constituent parts such as a sun wheel and a planetary wheel, an input side thereof is directly or indirectly coupled to a barrel complete and a ratchet wheel or a barrel stem, and an output side thereof is directly or indirectly coupled to a display wheel supporting a display hand pivoted in a face in parallel with an extended face of a dial (for example, Japanese Patent Publication No.2757147 and Japanese Patent Publication No.3054943).

However, the planetary mechanism is necessarily accompanied by a number of train wheels and integrated as one set and therefore, a comparatively large region is occupied thereby and also a structure thereof is liable to be complicated.

On the other hand, it is proposed to use a screw mechanism for a power reserve display mechanism in place of the planetary mechanism (JP-A-2003-227883). According to the proposal of JP-A-2003-227883, a male screw wheel and a female screw wheel respectively having gear portions are brought in mesh with gear portions of a ratchet wheel and a barrel wheel, the female screw wheel is provided with a conical portion and the conical portion is engaged with an arm integrated with an indicator, and the arm is pivoted in accordance with movement of the female screw wheel in an axial direction.

According to the power reserve display mechanism disclosed in JP-A-2003-227883, in order to pivot the arm in a face in parallel with an extended face of a dial, the male screw wheel and the female screw wheel are rotated around a rotational axis line orthogonal to the dial and moved relative to each other in a thickness direction of a timepiece.

Therefore, a size in the thickness direction is liable to be enlarged.

Further, in any of the power reserve display mechanisms of the background arts, the indicator is pivoted in the face in parallel with the display face of the dial.

The invention has been carried out in view of the above-described point and it is an object thereof to provide a power reserve display mechanism having a mainspring remaining display showing a novel behavior and a mechanical timepiece having the same.

SUMMARY OF THE INVENTION

In order to achieve the above-described object, a power power reserve display mechanism of the invention includes a displacement conversion mechanism having a first rotation input portion coupled to a ratchet wheel and rotated in accordance with rotation of the ratchet wheel and a second rotation input portion coupled to a barrel wheel and rotated in accordance with rotation of the barrel wheel as well as an output portion linearly moved in one direction in accordance with rotation of the first rotation input portion and linearly moved in other direction in accordance with rotation of the second rotation input portion, and mainspring accumulating remaining amount display means provided at the output portion of the displacement conversion mechanism for displaying a mainspring accumulating remaining amount by a position along a linear line.

The power reserve display mechanism of the invention is provided with "the displacement conversion mechanism having the first rotation input portion coupled to the ratchet wheel and rotated in accordance with rotation of the ratchet wheel and the second rotation input portion coupled to the barrel wheel and rotated in accordance with rotation of the barrel wheel as well as the output portion linearly moved in one direction in accordance with rotation of the first rotation input portion and linearly moved in other direction in accordance with rotation of the second rotation input portion" and therefore, in winding up the mainspring in accordance with rotation of the ratchet wheel, the output portion of the displacement conversion mechanism is moved linearly in one direction and in rotating the barrel wheel in accordance with releasing the mainspring, the output portion of the displacement conversion mechanism is moved linearly in other direction. Further, the power reserve display mechanism of the invention is provided with "the mainspring accumulating remaining amount (power reserve) display means provided at the output portion of the displacement conversion mechanism for displaying the mainspring accumulating remaining amount by the position along the linear line" and therefore, by winding up the mainspring in accordance with rotation of the ratchet wheel, the mainspring accumulating remaining amount display means provided at the output portion of the displacement conversion mechanism is moved linearly in one direction to be able to display the accumulating remaining amount in accordance with winding up the mainspring, in accordance with rotation of the barrel wheel in accordance with releasing the mainspring, the mainspring accumulating remaining amount display means provided at the output portion of the displacement conversion mechanism is moved linearly in other direction to be able to display the accumulating remaining amount of the mainspring by the linear displacement position. That is, according to the power reserve display mechanism of the invention, the mainspring accumulating remaining amount display means is moved linearly in accordance with rotation of the barrel wheel and therefore, a display of the mainspring accumulating remaining amount giving a novel impression different from a display of a timepiece of the background art can be provided.

According to the power reserve display mechanism of the invention, typically, the display means is moved in parallel with an extended face of the dial on a side of the dial of a timepiece. In this case, the mainspring accumulating remaining amount can be displayed in a desired one direction along the extended face of the dial. Further, the display means may be moved linearly on this side of the dial (space between the dial and timepiece glass), may be moved linearly on a depth side of the dial, or may be moved linearly in the extended face of the dial so far as there is not a concern of hampering operation of the time display hand of the timepiece. When the display means is moved linearly on this side of the dial, a linear long hole is formed to the dial, and the display means is attached to an attaching portion projected to this side of the dial from the output portion of the displacement conversion mechanism disposed on the depth side of the dial by way of the long hole. When the display means is moved linearly on the depth side of the dial, a linear transparent portion (window) may be provided to the dial and the position of the display means may optically be recognized via the transparent portion, or a linear long hole may be provided at the dial and the position of the display means may optically be recognized via the long hole. In any of the cases, a graduation indicating the accumulating remaining amount is typically attached to the dial.

According to the power reserve display mechanism of the invention, the displacement conversion mechanism typically includes a structure of screwing a male screw and a female screw. Further in details, according to the power reserve display mechanism of the invention, typically, the displacement conversion mechanism includes a male screw wheel structure having a male screw wheel and a male screw member integrally coupled to the male screw wheel, and a female screw wheel structure having a female screw operating wheel and a female screw member screwed to the male screw member and constituted such that the female screw member is linearly made to be proximate to and remote from the female screw operating wheel by being rotated in accordance with rotation of the female screw operating wheel, and one of the male screw wheel and the female screw operating wheel is coupled to the ratchet wheel and other thereof is coupled to the barrel wheel. That is, one of the male screw wheel and the female screw operating wheel constitutes the first rotation input portion coupled to the ratchet wheel and other thereof constitutes the second rotation input portion coupled to the barrel wheel.

In this case, in winding up the mainspring, in accordance with rotation of the ratchet wheel, the female screw member is moved linearly in one direction relative to the female screw operating wheel, in releasing the mainspring, in accordance with rotation of the barrel wheel, the female screw member is moved linearly in other direction relative to the female screw operating wheel. Therefore, the female screw member functions as the output portion. According to the power reserve display mechanism having such a constitution, not only a number of parts is minimized, a space efficiency is excellent and small-sized formation can be achieved but also fabrication thereof is facilitated and cost can be minimized. Further, when the female screw portion is moved in parallel with the extended face of the dial, not only a thickness thereof can be minimized but also a plane size thereof can be minimized. Although the display means is typically provided separately from the female screw member operated as the output portion, for example, the female screw member may be constituted by a portion of the display means such that a circle is inscribed on an outer peripheral face of the female screw member and the circle per se is made to constitute a main body of the display means or the like.

When the displacement conversion mechanism is constituted by the structure of screwing the male screw and the female screw as described above in the power reserve display mechanism of the invention, one number of a number of an intermediate male screw wheel and a male screw operating wheel for connecting the male screw wheel and one of the ratchet wheel and the barrel wheel and a number of an intermediate female screw wheel for connecting a female screw operating wheel and other of the ratchet wheel and the barrel wheel is constituted by an even number and other thereof is constituted by an odd number. Thereby, the intermediate male operating wheel and the male screw wheel can be brought in mesh with each other at one end portion in a diameter direction, the intermediate female screw wheel and the female screw operating wheel can be brought in mesh with each other at an end portion on an opposed side in the diameter direction and therefore, one input can be received from the ratchet wheel on the one end face side of the barrel complete and other input can be received from the barrel wheel on the other end face side of the barrel complete.

Further, here, the even number includes 0 and the input may be executed to the input portion directly from the ratchet wheel or the barrel wheel without interposing the intermediate wheel or the intermediate wheel and the operating wheel. However, according to the power reserve display mechanism of the invention, typically, the ratchet wheel and the male screw wheel are coupled by way of the intermediate male screw wheel and the male screw operating wheel and the barrel wheel and the female screw operating wheel are coupled by way of the intermediate female screw wheel. Thereby, the direction of linearly moving the display means can be adopted to a direction different from a radius direction of the barrel wheel and the space can efficiently be utilized.

When the displacement conversion mechanism is constituted by the structure of screwing the male screw and the female screw as described above in the power reserve display mechanism of the invention, the female screw operating wheel of the female screw wheel structure is fitted to a nonscrew portion to be rotated around the nonscrew portion of the male screw wheel structure in accordance with rotation of the barrel wheel, the female screw member includes a through hole extended in parallel with a direction of extending the male screw member, and the female screw wheel structure includes a guide rod extended from the female screw operating wheel in parallel with the male screw member and slidably fitted to the through hole of the female screw member. In this case, the female screw member can be reciprocated by being supported stably. Further, the guide rod may be supported by one side thereof, or supported by both sides thereof to be stabilized further.

When the displacement conversion mechanism is constituted by the structure of screwing the male screw and the female screw as described above in the power reserve display mechanism of the invention, typically, the mainspring remaining amount display means is fitted to the female screw member rotatably and unmovably in the direction of extending the male screw member and is linearly movable in parallel with the extended face of the dial. When a long hole is formed at the dial, rotation of the remaining amount display means may be restricted by a side wall of the long hole, or by providing an arm portion projected transversely at the display means and providing a groove portion for linearly guiding the arm portion on a main plate and the like, the display means may linearly be guided while restricting rotation of the mainspring remaining amount display means. However, the female screw member may constitute a portion of the display means and the display means per se may be rotated such that a circle is inscribed on an outer peripheral face of the female screw member and the circle per se is made to constitute the main body of the display means as described above.

According to the invention, the power reserve display mechanism is typically integrated to a mechanical timepiece, typically, a mechanical watch. However, when desired, the power reserve display mechanism may be integrated to other apparatus driven by a mainspring.

BRIEF DESCRIPTION OF THE SEVERAL VIEWS OF THE DRAWINGS

A preferred form of the present invention is illustrated in the accompanying drawings in which:

FIG. 1 show portions of a mechanical timepiece having a power reserve display mechanism according to a preferable embodiment of the invention.

FIG. 2 illustrate views viewed from an arrow mark II direction of FIG. 1.

DETAILED DESCRIPTION OF THE PREFERRED EMBODIMENTS

Figures 1A, 1B:
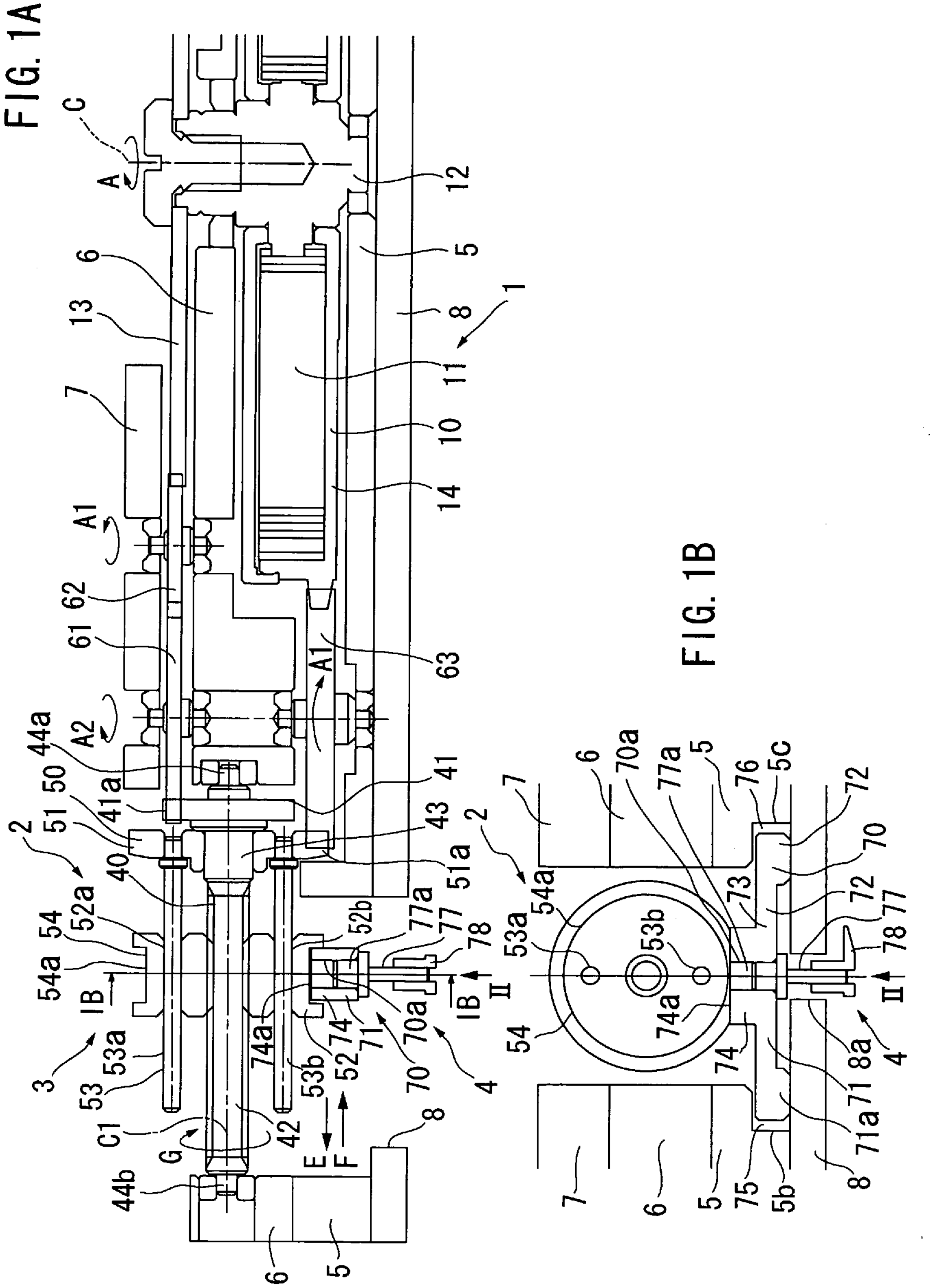
FIG. 1A is an explanatory view of a vertical section shown by a section along a drive train wheel.
FIG. 1B is an explanatory view of a section taken along a line IB—IB of FIG. 1A.

An explanation will be given of a preferable embodiment of the invention based on a preferable embodiment shown in the attached drawings.

As shown in FIGS. 1 and 2, a mechanical wrist watch 1 includes a barrel complete 10 having a mainspring 11. A barrel stem 12 of the barrel complete 10 is rotatably supported by a main plate 5 and a first bridge 6. In the barrel complete 10, by rotating a ratchet wheel 13 fixed to the barrel stem 12 in A direction around a center axis line C of the barrel complete 10, the mainspring 11 is wound up and in releasing the mainspring 11, a barrel wheel 14 is rotated in A direction. Numeral 15 designates a click for prohibiting the ratchet wheel 13 from being rotated reversely.

Figure 3:
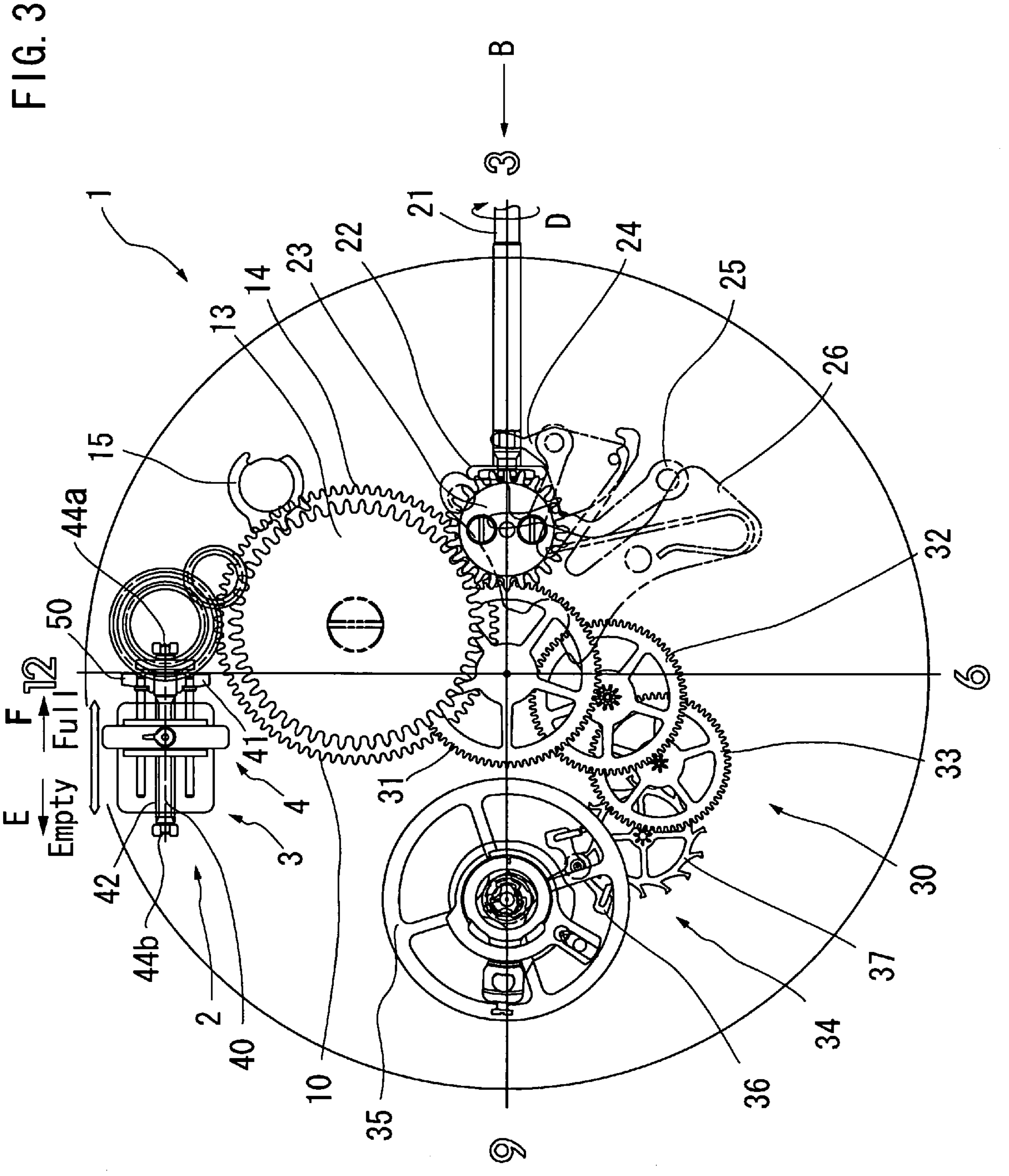
FIG. 3 is a plane explanatory view showing a state of coupling a train wheel or the like of the mechanical timepiece of FIG. 1.

As shown by FIG. 3, according to the mechanical wrist watch 11, in the case in which when a winding stem 21 is disposed at 0 stage position pushed in B direction, the winding stem 21 is rotated in D direction, in accordance with rotation in D direction of the winding stem 21, a winding pinion 22 is rotated, rotation of the winding pinion 22 is transmitted to the ratchet wheel 13 by way of a crown wheel 23, the mainspring 11 is wound up, and a mainspring accumulating remaining amount (power reserve (amount)) P is increased. Further, numeral 24 designates a setting lever, numeral 25 designates a yoke, and numeral 26 designates a setting lever jumper.

Power of the mainspring 11 in releasing the mainspring 11 is transmitted to a fourth wheel & pinion 33 under direct control of a speed control mechanism or an escapement 34 from the barrel wheel 14 via a center wheel & pinion 31 and a third wheel & pinion 32 of a train wheel 30. A rotational speed of the fourth wheel & pinion 33 is rectified by the escapement or the speed control mechanism 34 including a balance with hairspring 35, a pallet fork 36 and an escape wheel & pinion 37, and also the other wheels 31, 32 of the train wheel 30 brought in mesh with the fourth wheel & pinion 33 are rotated by speeds in accordance with the rotational speed of the fourth wheel & pinion 33 rectifying second.

As is known from FIG. 1 and FIG. 3, the mechanical timepiece 1 includes a power reserve display mechanism 2 coupled to the barrel complete 10. The power reserve display mechanism 2 includes a displacement conversion mechanism 3 having a male screw wheel structure 40 and a female screw wheel structure 50, and mainspring accumulating remaining amount display means or power reserve display means 4.

The first wheel structure 40 includes a male screw wheel 41 as a first rotation input portion, a male screw member 42 integral with the male screw wheel 41, and a nonscrew portion 43 formed between the male screw wheel 41 and the male screw member 42, and is rotatably supported by a first bridge 6 at a base end portion 44*a* at a vicinity of the male screw wheel 41 and a front end portion 44*b* at a vicinity of a front end of the male screw member 42. The male screw wheel 41 is brought in mesh with a gear portion of a male screw operating wheel 61 at a gear portion 41*a* thereof on a side opposed to a dial 8 of the timepiece 1, and is coupled to the ratchet wheel 13 by the male screw operating wheel 61 and the gear portion by way of an intermediate male screw wheel 62 brought in mesh therewith. The male screw operating wheel 61 and the intermediate male screw wheel 62 are supported by the first bridge 6 and the train wheel bridge 7 rotatably around respective rotational center axis lines.

Therefore, when the ratchet wheel 13 is rotated in A direction in winding up the mainspring 11, in accordance with rotation of the ratchet wheel 13, the intermediate male screw wheel 62 is rotated in A1 direction, the male screw operating wheel 61 is rotated in A2 direction, and the male screw structure 50 including the male screw wheel 41 and the male screw member 42 is rotated in G direction.

The female screw wheel structure 50 includes a female screw operating wheel 51 as a second rotation input portion rotatably fitted to the nonscrew portion 43 of the male screw wheel structure 40, a female screw member 52, guide means 53 for guiding the female screw member 52 as an output portion. The guide means 53 is constituted by a plurality of guide rods 53*a*, 53*b* fixed to the female screw operating wheel 51 at portions thereof spaced apart from each other by an interval in a peripheral direction (an angular interval of 180 degrees in this example) and extended from the female screw operating wheel 51 in parallel with an axis line C1. The female screw member 52 is screwed to the male screw member 42 of the male screw wheel structure 40 and fitted to the guide rods 53*a*, 53*b* slidably in E, F directions at hole portions 52*a*, 52*b* thereof. The female screw operating wheel 51 is brought in mesh with a gear portion of an intermediate female screw wheel 63 at a gear portion 51*a* on a side of the dial 8 of the timepiece 1 and coupled to the barrel wheel 14 via the intermediate female screw wheel 63. The intermediate female screw wheel 63 is rotatably supported by the main plate 5 and the first bridge 6.

When the barrel wheel 14 is rotated in A direction in consuming power of the mainspring 11, in accordance with rotation of the barrel wheel 14, the intermediate female screw wheel 63 is rotated in A1 direction and the female screw operating wheel 51 and the female screw member 52 are rotated in G direction. Here, the female screw member 52 is displaced in E direction (a direction in parallel with a direction of extending the center axis line C1 of the male screw member 42 and a direction of being proximate to the front end portion 44*b*) relative to the male screw member 42 in accordance with the rotation in G direction.

Further, when the male screw structure 40 is rotated in G direction in accordance with rotation in A direction of the ratchet wheel 13, the female screw member 52 which is screwed to the male screw member 42 of the male screw structure 40 and rotation of which is prohibited as explained below, is displaced in F direction (a direction in parallel with the direction of extending the center axis line C1 of the male screw member 42 and a direction of being proximate to the base end portion 44*a*) relative to the male screw member 42.

Figure 2A:
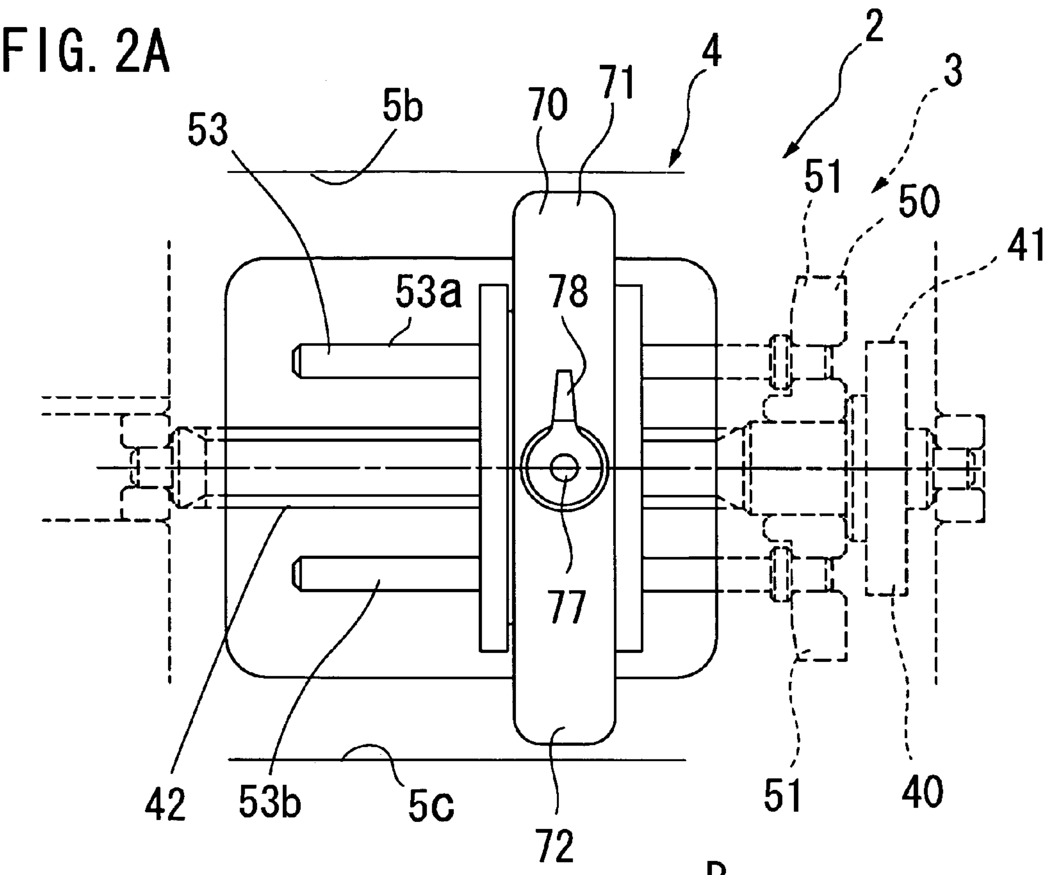
FIG. 2A is a plane explanatory view of a state of omitting a dial.
Figure 2B:
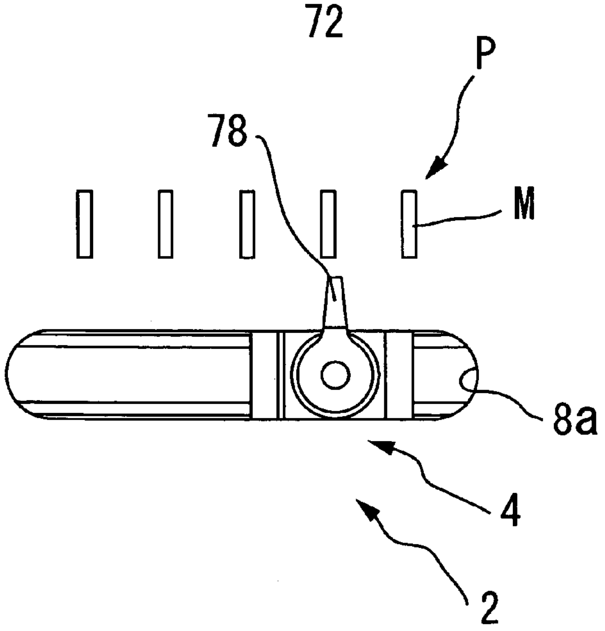
FIG. 2B is a plane explanatory view of a state in which the dial is present.

The female screw member 52 includes a circular peripheral groove 54 at an outer peripheral portion thereof and the peripheral groove 54 is engaged with a display lever 70 relatively rotatably. As shown by FIGS. 1A and B, the display lever 70 includes a lever main body 73 having a pair of arm portions 71, 72 extended in parallel with the dial 8 in a face orthogonal to the center axis line C1, and a center projected portion 74 projected to a back face side of a center portion of the lever main body 73. The arm portions 71, 72 are thick-walled at respective extended end portions 71*a*, 72*a* thereof, and fitted to gap portions 75, 76 between corresponding notched portions 5*b*, 5*c* of the main plate 5 and the dial 8 at the thick-walled end portions 71*a*, 72*a* slidably in E, F directions. The center projected portion 74 of the display lever 70 is brought into slidable contact with a bottom face 54*a* of the peripheral groove 54 at a back face 74*a* thereof.

Therefore, the display lever 70 is parallelly moved in F direction in accordance with rotation in A direction of the ratchet wheel 13 bringing about an increase in the mainspring accumulating remaining amount P by winding up the mainspring 11 and parallelly moved in E direction in accordance with rotation in A direction of the barrel wheel 14 accompanied by a reduction in the mainspring accumulating remaining amount P by releasing the main spring 11.

Figure 4:
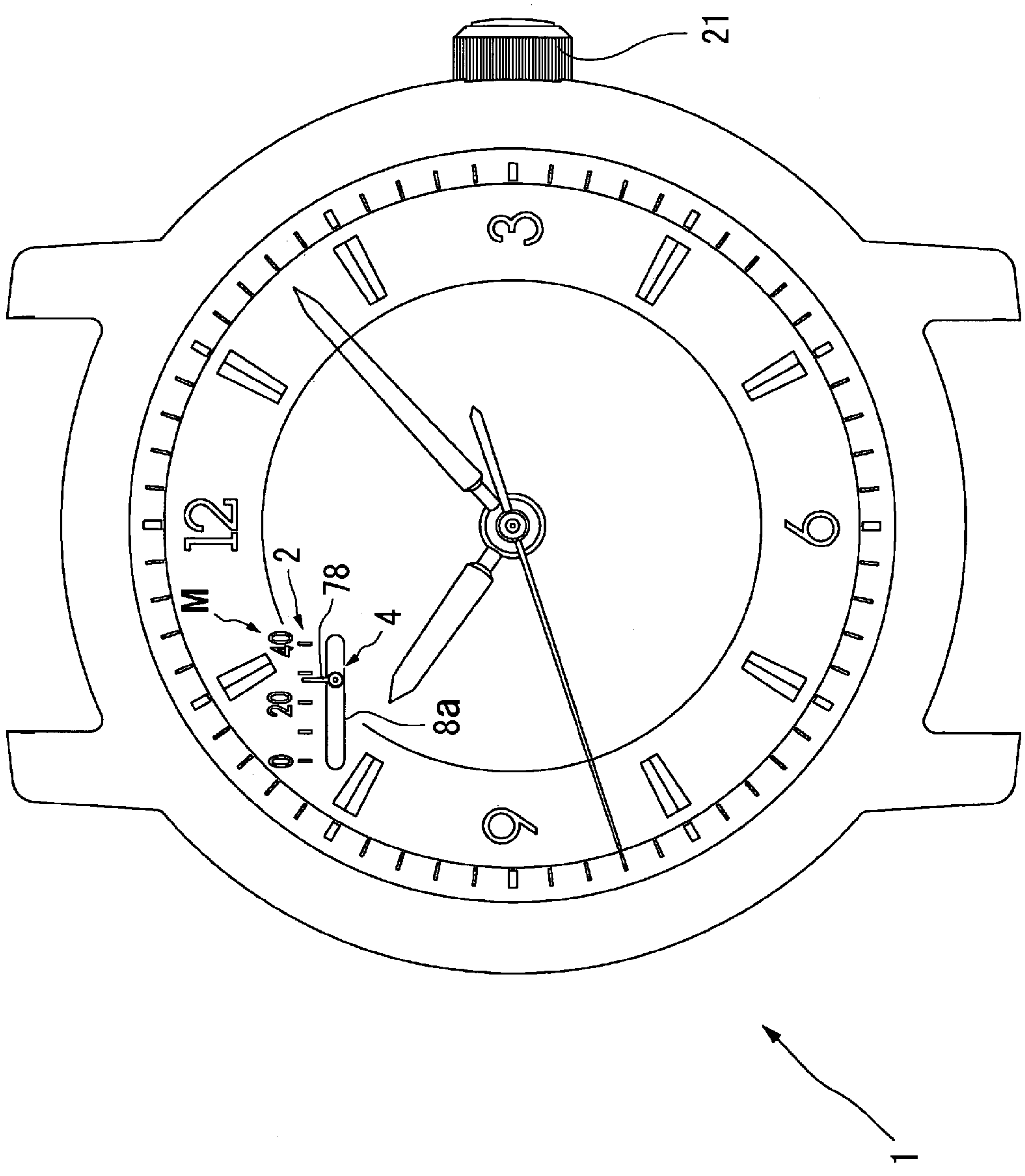
FIG. 4 is a plane explanatory view of the mechanical timepiece of FIG. 1.

The display lever 70 is attached with a display hand 78 via a display hand attaching shaft portion 77. The display hand attaching shaft portion 77 includes a base end portion 77*a* and a shaft portion 77*b*, the base end portion 77*a* is fittingly attached to an attaching hole 70*a* of the display lever 70, the shaft portion 77*b* is projected by penetrating a long hole 8*a* of the dial 8 from the base end portion 77*a*, and the display hand 78 is fittingly attached to a projected end portion of the shaft portion 77*b*. Further, a graduation M indicating the mainspring accumulating remaining amount P is attached to a portion of the dial 8 along the long hole 8*a* FIGS. 2A–2B and FIG. 4).

Therefore, the display hand 78 indicates the mainspring accumulating remaining amount P increased by being parallelly moved in F direction along the graduation M in accordance with rotation in A direction of the ratchet wheel 13 bringing about the increase in the mainspring accumulating remaining amount P by winding up the mainspring 11 and indicates the mainspring accumulating remaining amount P reduced by being parallelly moved in E direction in accordance with rotation in A direction of the barrel wheel 14 bringing about the reduction in the mainspring accumulating remaining amount P by releasing the mainspring 11.

As described above, according to the power reserve display mechanism 2, in accordance with the mainspring accumulating remaining amount (power reserve (amount)) P, the display hand 78 is linearly moved along the dial 8, and the mainspring accumulating remaining amount P is displayed. Further, according to the power reserve display mechanism 2, the displacement conversion mechanism 3 is constituted by the male screw wheel structure 40 and the female screw wheel structure 50, the male screw member 42 of the male screw wheel structure 40 is extended in parallel with the dial 8, also the display hand 78 is moved in parallel with the dial 8 and therefore, the structure can be simplified, a number of parts can be minimized and the thickness can be minimized. Further, according to the power reserve display mechanism 2, the intermediate wheels 62, 63 are pertinently provided and therefore, the direction of extending the male screw member 42 can be adopted to a desired direction suitable for display and suitable for effectively utilizing a space and therefore, a planar occupying space can also be minimized.

Figure 5:
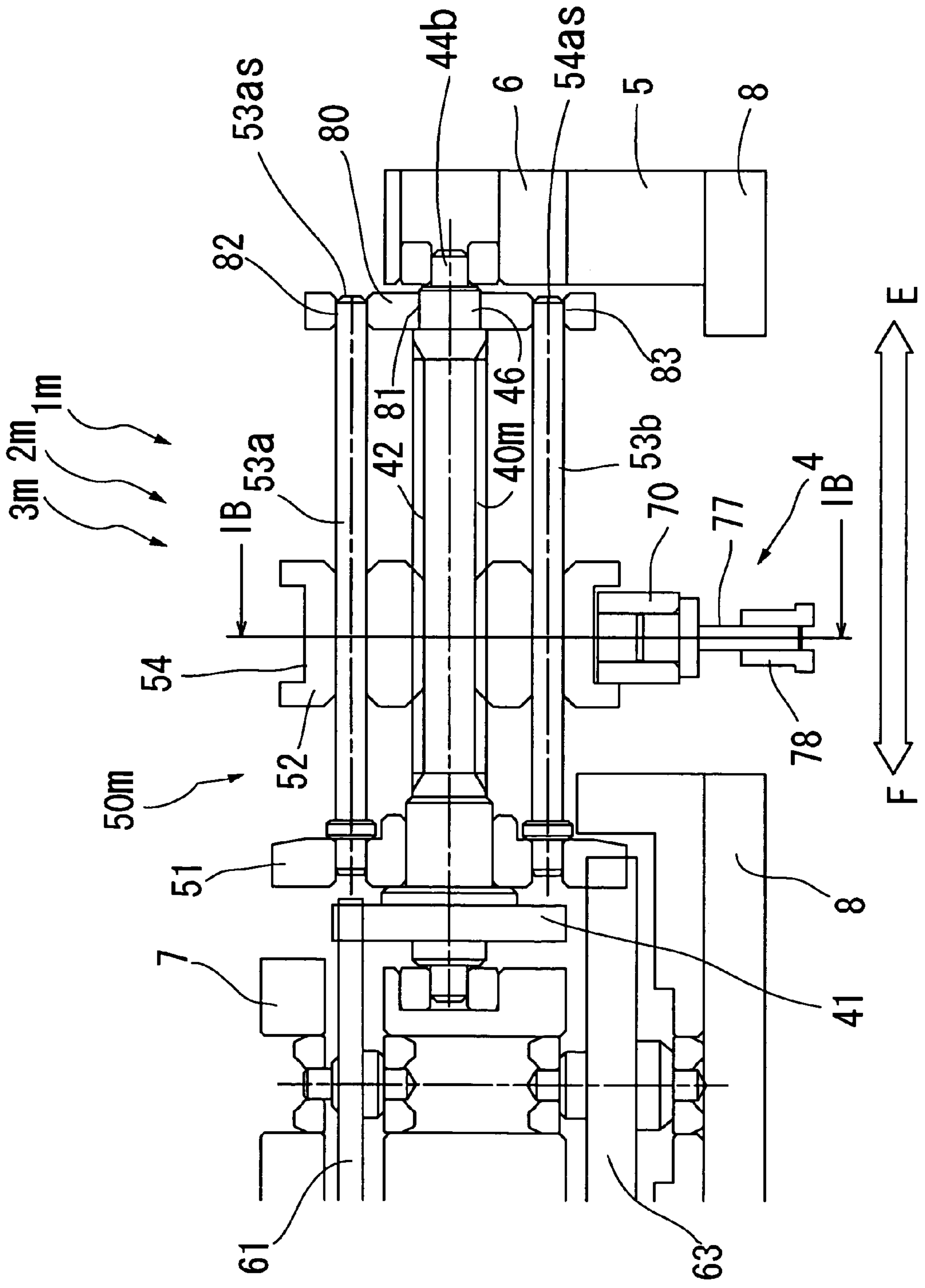
FIG. 5 is an explanatory view of a section showing a portion of a modified example of the power reserve display mechanism of FIG. 1 by a section similar to that of FIG. 1A.

FIG. 5 shows a portion of a mechanical timepiece 1*m* having a power reserve display mechanism 2*m* according to a modified example by a section similar to that of FIG. 1A. In the modified example, members, portions or elements similar to those of the embodiments shown in FIG. 1 through FIG. 4 are attached with the same notations and with regard to those portions of which differ, added characters m are attached to final portions of notations.

A female screw wheel structure 50*m* of a displacement conversion portion 3*m* of the power reserve display mechanism 2*m* further includes a guide support wheel 80 for supporting front end portions 53*as*, 53*bs* of the guide rods 53*a*, 53*b*, and a male screw wheel structure 40*m* includes a nonscrew portion 46 similar to the nonscrew portion 43 on a side of the front end portion 44*b* of the male screw portion 42. The guide support wheel 80 is provided with a structure similar to that of the female screw operating wheel 41 except that the guide support wheel 80 is devoid of a gear portion at an outer periphery thereof. The guide support wheel 80 is provided with a center hole 81 and hole portions 82, 83, fitted slidably and rotatably to the nonscrew portion 46 of the male screw wheel structure 40*m* at the center hole 81 and is fittingly attached with the front end portions 53*as*, 53*bs* of the guide rods 53*a*, 53*b* at the hole portions 82, 83.

According to the power reserve display mechanism 2*m*, the guide rods 53*a*, 53*b* can firmly be held in a state of being extended in E, F directions and therefore, the female screw member 52 can further smoothly be moved in E, F directions. It is apparent that other point is similar to that of the power reserve display mechanism 2.

What is claimed is:

1. A power reserve display mechanism comprising:

a displacement conversion mechanism having a first rotation input portion coupled to a ratchet wheel and rotated in accordance with rotation of the ratchet wheel and a second rotation input portion coupled to a barrel wheel and rotated in accordance with rotation of the barrel wheel as well as an output portion linearly moved in one direction in accordance with rotation of the first rotation input portion and linearly moved in other direction in accordance with rotation of the second rotation input portion; and mainspring accumulating remaining amount display means provided at the output portion of the displacement conversion mechanism for displaying a mainspring accumulating remaining amount of a mainspring coupled to said ratchet wheel and said barrel wheel by a position along a linear line.

2. A power reserve display mechanism according to claim 1, wherein the mainspring accumulating remaining amount display means is moved in parallel with an extended face of a dial on a side of the dial of a timepiece.

3. A power reserve display mechanism according to claim 1, wherein the displacement conversion mechanism includes a male screw wheel structure having a male screw wheel and a male screw member integrally coupled to the male screw wheel, and a female screw wheel structure having a female screw operating wheel and a female screw member screwed to the male screw member and constituted such that the female screw member is linearly made to be proximate to and remote from the female screw operating wheel by being rotated in accordance with rotation of the female screw operating wheel; and wherein one of the male screw wheel and the female screw operating wheel is coupled to the ratchet wheel and other thereof is coupled to the barrel wheel.

4. A power reserve display mechanism according to claim 3, wherein one number of a number of an intermediate male screw wheel and a male screw operating wheel for connecting the male screw wheel and one of the ratchet wheel and the barrel wheel and a number of an intermediate female screw wheel for connecting a female screw operating wheel and other of the ratchet wheel and the barrel wheel is constituted by an even number and other thereof is constituted by an odd number.

5. A power reserve display mechanism according to claim 4, wherein the ratchet wheel and the male screw wheel are coupled by way of the intermediate male screw wheel and the barrel wheel and the female screw operating wheel are coupled by way of the intermediate female screw wheel.

6. A power reserve display mechanism according to claims 3, wherein the female screw operating wheel of the female screw wheel structure is fitted to a nonscrew portion to be rotated around the nonscrew portion of the male screw wheel structure in accordance with rotation of the barrel wheel, the female screw member includes a through hole extended in parallel with a direction of extending the male screw member, and the female screw wheel structure includes a guide rod extended from the female screw operating wheel in parallel with the male screw member and sliadably fitted to the through hole of the female screw member.

7. A power reserve display mechanism according to claim 3, wherein the mainspring remaining amount display means is fitted to the female screw member rotatably and unmovably in the direction of extending the male screw member and is linearly movable in parallel with an extended face of a dial.

8. A mechanical timepiece having the power reserve display mechanism according to claim 1.

* * * * *